(12) United States Patent
Johannsen

(10) Patent No.: US 8,276,356 B2
(45) Date of Patent: Oct. 2, 2012

(54) TRACTOR MOUNTED COTTON HARVESTER

(75) Inventor: Daniel John Johannsen, Des Moines, IA (US)

(73) Assignee: Deere & Company, Moline, IL (US)

( * ) Notice: Subject to any disclaimer, the term of this patent is extended or adjusted under 35 U.S.C. 154(b) by 311 days.

(21) Appl. No.: 12/713,998

(22) Filed: Feb. 26, 2010

(65) Prior Publication Data

US 2011/0209454 A1 Sep. 1, 2011

(51) Int. Cl.
*A01F 12/00* (2006.01)
(52) U.S. Cl. ......................................................... 56/17.2
(58) Field of Classification Search ................ 56/10.2 E, 56/17.2, 30, 40, 15.6
See application file for complete search history.

(56) References Cited

U.S. PATENT DOCUMENTS

| | | | | |
|---|---|---|---|---|
| 3,212,247 A * | 10/1965 | Erickson | ........................ | 56/126 |
| 3,218,788 A * | 11/1965 | Hubbard | ........................... | 56/28 |
| 3,222,851 A * | 12/1965 | Schnaidt et al. | ........... | 56/10.2 R |
| 3,352,092 A * | 11/1967 | Hubbard | ........................ | 56/13.2 |
| 3,373,547 A * | 3/1968 | Hubbard | ........................... | 56/44 |
| 3,416,296 A * | 12/1968 | Culp | ................................ | 56/28 |
| 4,327,540 A * | 5/1982 | Swanson | ........................ | 56/11.9 |
| 4,335,561 A * | 6/1982 | Swanson et al. | ........... | 56/10.2 E |
| 4,414,792 A * | 11/1983 | Bettencourt et al. | ........ | 56/10.2 E |
| 4,483,131 A * | 11/1984 | Schlueter | ........................ | 56/15.6 |
| 4,567,719 A * | 2/1986 | Soots et al. | ..................... | 56/364 |
| RE32,699 E * | 6/1988 | Fachini | ............................. | 56/44 |
| 5,519,988 A * | 5/1996 | Copley et al. | ..................... | 56/30 |
| 5,661,964 A * | 9/1997 | Paulson et al. | .................... | 56/64 |
| 5,878,558 A * | 3/1999 | Fox et al. | ........................ | 56/14.7 |
| 7,661,251 B1 * | 2/2010 | Sloan et al. | ................ | 56/10.2 E |
| 2010/0043368 A1 * | 2/2010 | Sloan et al. | ................ | 56/10.2 E |
| 2010/0281837 A1 * | 11/2010 | Talbot | ........................ | 56/10.2 E |
| 2011/0209454 A1 * | 9/2011 | Johannsen | ........................ | 56/30 |

* cited by examiner

Primary Examiner — Arpad Fabian-Kovacs

(57) ABSTRACT

A low-cost, highly maneuverable cotton harvester (10) with a row unit (26) that effectively follows the ground contour includes frame structure (30) pivotally connected to the two lower links (22) of a tractor three-point hitch (14). A picking unit (26) is connected by a linkage structure (52) to the frame (30) and is closely coupled behind a rear drive wheel (16) of the tractor (12). A lift arm (98) extends forwardly and downwardly from an end (99) pivotally connected to the linkage structure (52a). The lower forward end of the lift arm includes a non-steerable gauge wheel (44) generally aligned with the tractor axle (44a), and a hydraulic cylinder (100) pivots the lift arm (98) relative to the linkage structure to adjust row unit operating height and to raise and lower the row unit to and from the field operating position. The gauge wheel axis (44a) is aligned with the axis (16a) of the drive wheel (16). A variable speed pulley assembly (90) synchronizes picker drum speed to ground speed.

18 Claims, 3 Drawing Sheets

TRACTOR MOUNTED COTTON HARVESTER

FIELD OF THE INVENTION

The present invention relates generally to cotton harvesters and, more specifically, to tractor-mounted cotton harvesters.

BACKGROUND OF THE INVENTION

A large percentage of cotton growing areas in the world rely on low-cost manual labor or custom harvesters to harvest crop. Most commercially available cotton harvesters are too expensive to effectively compete in these cotton growing areas. Although lower cost harvesters are available, such as the John Deere 7260 Cotton Picker and the Pamak Ptm2 tractor mounted picking machine, the transition away from hand picking and custom harvesting heretofore has been relatively slow. Some of the available harvesting machines are still too expensive to be affordable for small cotton operations. Maintaining cotton picker drum speed synchronization with ground speed for efficient harvesting can present problems, particularly in view of the wide range of tractors that may be used with the harvester and the large variance in desired ground speed. The need exists for an improved low cost, efficient harvester that easily attaches to a tractor, maneuvers well though small fields and follows ground contour well.

SUMMARY OF THE INVENTION

A low-cost, highly maneuverable cotton harvester with a row unit that effectively follows the ground contour includes unique frame structure that pivotally attaches to the two lower links of a tractor three-point hitch. A picking unit is connected by a linkage structure to the frame and is closely coupled adjacent a rear drive wheel of the tractor. A lift arm extends forwardly and downwardly from a location adjacent a parallel linkage pivotal connection. The lower forward end of the lift arm includes a ground wheel supporting the row unit side of the harvester, and a hydraulic cylinder pivots the lift arm to adjust row unit operating height and to raise and lower the row unit to and from a field operating position. The ground wheel axle aligns with the tractor drive wheel axle to avoid ground wheel scuffing during turns. A second support wheel connected to the frame behind the row unit and behind the three-point hitch provides rear support on the side of the harvester opposite the row unit.

The lift arm efficiently provides both row unit lift and height control functions. A parallel linkage may be used to help maintain the row unit in the proper attitude while the unit to moves up and down with the ground wheel over irregular ground surfaces. Alternatively, a simpler single pivoting arm arrangement may be provided. The semi-integrally mounted harvester is generally fixed in relationship to the tractor other than at the lower link pivotal connections to provide improved maneuverability compared to harvesters having an elongated hitch connection. The hitch connection and wheel structure provide fast and easy connection and disconnection of the harvester relative to the tractor. The harvester is self-supporting when removed from the tractor and is easily aligned with the tractor connecting points for quick mounting. A single low horsepower tractor can drive the harvester and maneuver the harvester through small fields. The design provides a tight turning radius with efficient height sensing and lift functions.

To synchronize the picking unit drum speed with ground speed, a variable speed drive is connected between the tractor power take-off (PTO) and the row unit drive. Variable sheaves may be used which are actuated manually, electrically or hydraulically to provide the desired synchronization speed and accommodate a wide range of compatible tractors and harvester ground speeds.

These and other objects, features and advantages of the present invention will become apparent from a reading of the description which follows when taken with the drawings.

DESCRIPTION OF THE PREFERRED EMBODIMENT

Figure 1:
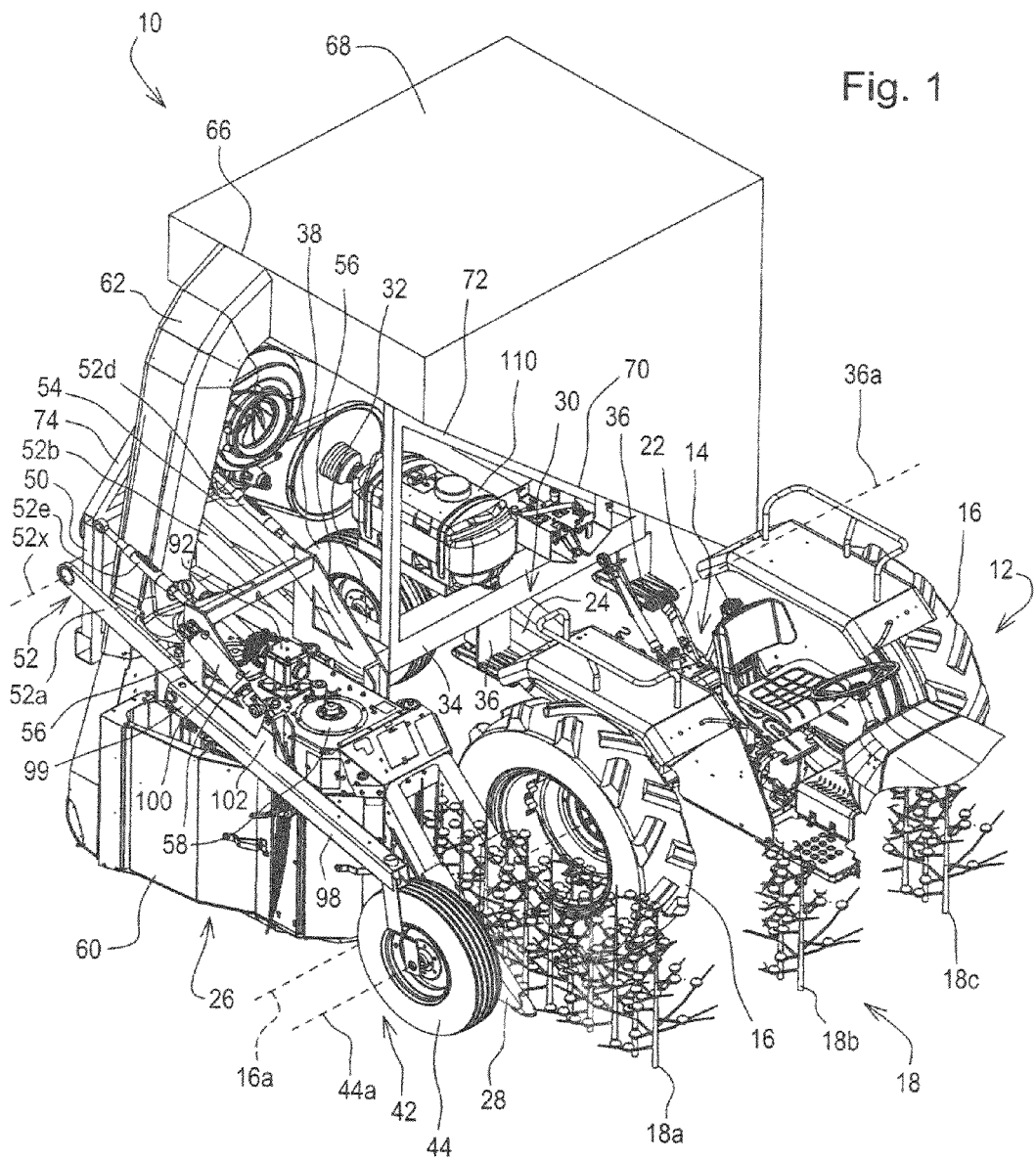
FIG. 1 is a side perspective view of a semi-integrally mounted harvester including a row unit, the harvester connected to the rear three-point hitch of a tractor.

Referring now to FIG. 1, therein is shown a harvester 10 attached to a towing vehicle such as a tractor 12 by a rear hitch 14. The tractor 12 includes rear ground engaging wheels 16 which propel the harvester 10 forwardly over a field of crop 18. As shown, the harvester 10 is a cotton picker and the crop 18 is cotton planted in transversely spaced parallel rows 18a, 18b and 18c.

The rear hitch 14 is a typical three-point tractor hitch having a pair of transversely spaced lower links or similar connecting members 22. A power take-off (PTO) shaft 24 is drivingly connected to the PTO on the tractor 12 and extends rearwardly between the connecting members 22. The harvester 10 includes a row unit 26 outwardly of one of the tractor wheels 16. As shown in FIG. 1, the leading portion or crop gathers 28 of the row unit 26 are generally coextensive with the adjacent right tractor wheel 16.

The harvester 10 includes a main frame 30 with a rectangular first frame portion 32 horizontally disposed behind the rear hitch 14 and the wheels 16. The first frame portion 32 includes a forward beam 34 having depending hitch connectors 36 transversely spaced to receive the ends of the lower links 22. The main frame 30 is fixed relative to the tractor 12 but can pivot about a transversely extending horizontal axis 36a defined by pivotal connections between the connectors 36 and the aft ends of the connecting members 22. A frame-supporting castor wheel 38 connected to a rear frame member 40 of the frame portion 32 is approximately aligned with centerline of the tractor 12. A vertically adjustable gauge wheel assembly 42 with a ground engaging gauge wheel 44 having a wheel axis 44a provides support, lift and height control functions on the row unit side of the harvester 10. The gauge wheel 44 is non-pivoting, and the fore-and-aft location of the wheel axis 44a closely approximates the fore-and-aft position of the rear wheel axis 16a so that the wheel 44 moves in an arc with the tractor to avoid scuffing during turns terms.

The main frame 30 includes an outer offset frame portion 50 terminating outwardly of one of the rear wheels 16 of the tractor 12. A linkage 52 with transversely spaced pivoting arms 52a and 52b is pivotally connected to the frame portion 50 and extends forwardly to a pivotal connection with a row unit support 54 having spaced side support members 56. The support members 56 are connected to opposite sides of the row unit 26. The arms 52a and 52b pivot about an axis 52x at the rear of the harvester 10. The linkage 52 is shown as a parallel linkage with upper adjustable links 52c and 52d pivotally connected to the frame portion 50 above the arms 52a and 52b, respectively, to help maintain the attitude of the row unit 26 during vertical movement. Alternatively, the linkage 52 may include only arms 52a and 52b fixed to the row unit support 54.

As shown, the row unit 26 is a conventional cotton picker row unit of the type shown in U.S. Pat. No. 5,519,988 having in-line spindle-type harvesting drums 58 supported on one side only of the row of crop 18a for removing cotton from the plants entering a crop receiving area defined between the crop gatherers 28. Cotton conveying door structure 60 directs cotton doffed from the spindles to a cotton duct 62 supported forwardly of the frame portion 50 between the arms 52a and 52b. A fan 64 provides an upwardly directed jet of air at a central location on the duct 62 to induce air flow upwardly from the bottom of the duct to an outlet 66 opening into the top of a basket 68. The air flow moves the cotton from the door structure 60 through the duct 62 and into the basket 68. The basket 68 includes a sloped bottom 70 supported on a basket frame 72 connected to the rectangular frame portion 32 behind the tractor 12 and to the offset frame portion 50 behind the row unit by a rear diagonal brace 74.

The PTO-driven shaft 24 is connected to drive pulley structure 80 located behind the frame portion 32. A belt 82 connects the drive pulley structure 80 with an intermediate pulley 83 which powers a fan drive pulley 84 connected by a belt 86 to a driven fan pulley 88 for the fan 64. A variable speed pulley assembly 90 driven by the intermediate pulley 83 includes with variable sheaves 90a and 90b connected by a drive belt 91 to a row unit drive 92 for rotating the in-line drums 58, spindles and doffers. The sheaves of the assembly 90 are adjustable to synchronize the rotational speed of the drums 58 with the forward speed of the row unit 26 so the relative velocity between the spindles and the plants in the harvest zone is approximately zero. Sheave adjustment to synchronize speed can be accomplished hydraulically, electrically or manually. Although a variable speed pulley is shown, it is to be understood that other types of transmissions may be used between the shaft 24 and the row unit drive 92 to provide the synchronization for different tractors and operating speeds.

The wheel assembly 42 includes a downwardly and forwardly directed arm 98 pivotally connected at an upper rearward end 99 to the side support member 56. An actuator 100, shown as a hydraulic cylinder, is pivotally connected at one end to the side support member 56 above the pivotal connection at the end 99. The opposite end of the actuator 100 is connected to a central portion of the arm 98 by a bracket 102. By extending and retracting the actuator 100, the arm 98 will pivot relative to the linkage 52 and move the wheel 44 relative to the row unit 26 to raise and lower the row unit 26. Therefore, the actuator 100 provides both a gauge wheel adjustment function for adjusting the operating height of the row unit 26 and a lift function for raising the row unit a substantial distance above a normal field-working position for transport. It is to be understood that although the wheel assembly 42 is shown with a pivoting arm 98, other types of adjustable gauge wheel assemblies and wheel connections relative to either the row unit 26 or the linkage 52 may also be utilized to provide gauging, ground contour following, lift and support functions. For example, a forwardly projecting support fixed to the row unit 26 with a wheel adjustable relative to the projecting support could be used instead of the pivoting arm 98.

Figure 2:
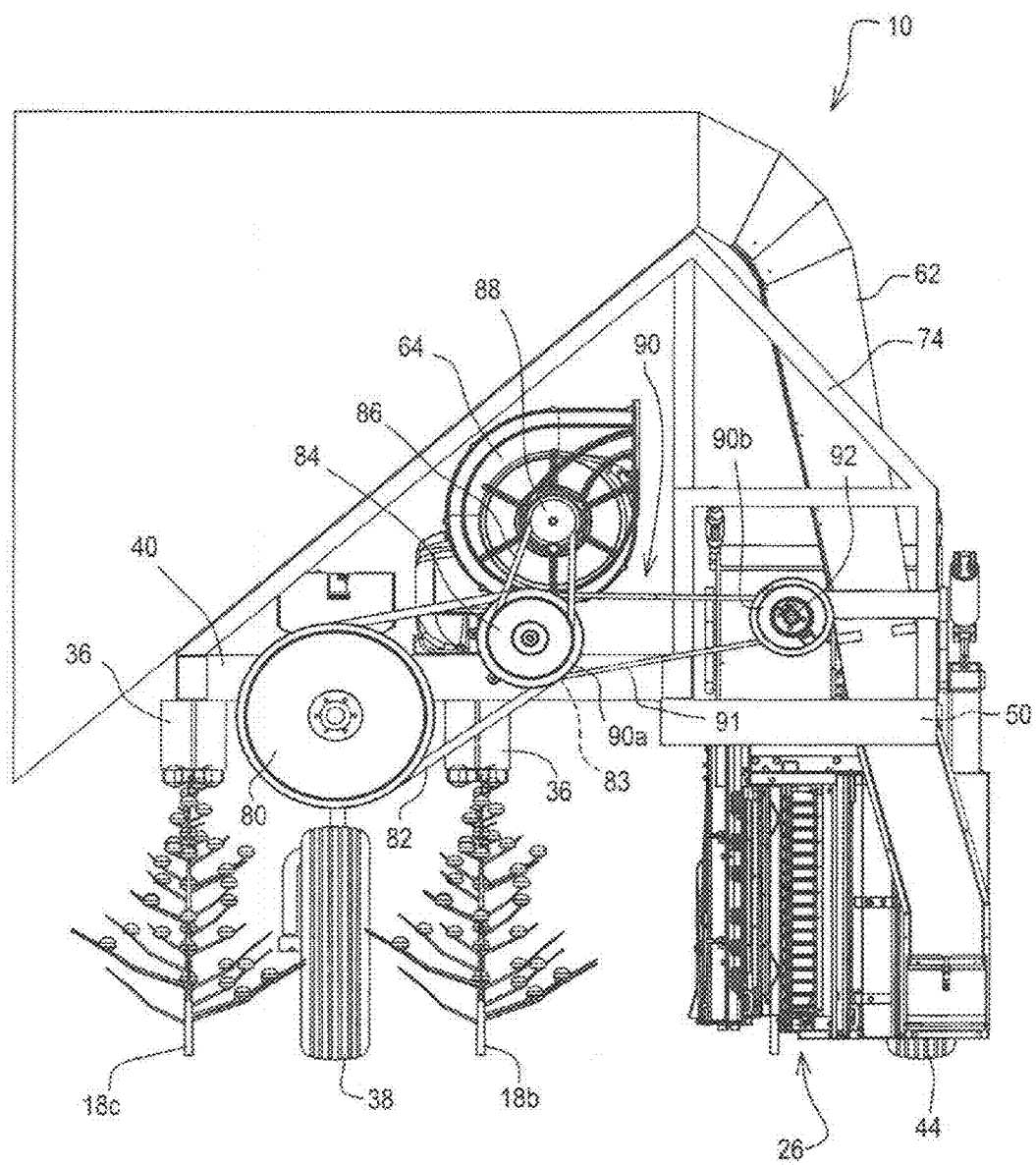
FIG. 2 is an enlarged rear view of the harvester of FIG. 1 showing the lift wheel assembly for raising and lowering the row unit.
Figure 3:
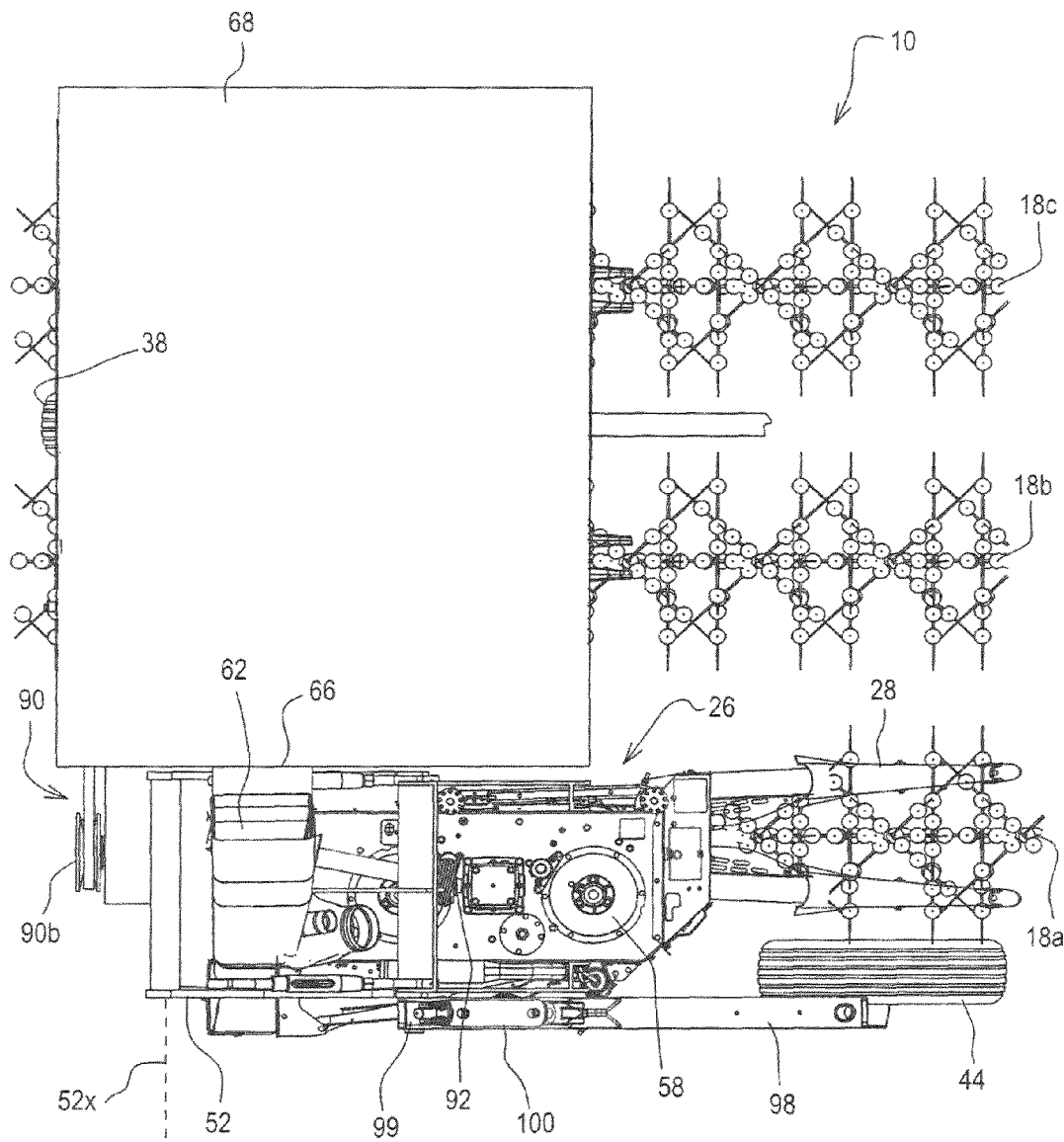
FIG. 3 is a top of the harvester of FIG. 1.

Additional harvester structure such a liquid tank 110 is supported on the frame 30 over the caster wheel 38 and below the basket 68. The relative locations of the caster wheel 38, wheel 44 and transversely spaced hitch connectors 36 provide balanced support for the harvester 10 and stability for the relatively heavy row unit 26. As shown in FIG. 2, a row of cotton 18b passes between the row unit 26 and the caster wheel 38. Another row of cotton 18c passes between the left tractor wheel 16 and caster wheel 38. The row unit 26 adjacent the right tractor wheel 16 and the row 18a entering the row unit 26 are easily visible from the operator station of the tractor 12 without need for the operator to be continually looking in the rearward direction.

Having described the preferred embodiment, it will become apparent that various modifications can be made without departing from the scope of the invention as defined in the accompanying claims.

The invention claimed is:

1. In a combination of a tractor movable in a forward direction over a field of plants to be harvested and a harvester, the tractor having a rear ground engaging wheel with an axle and equipped with a hitch including a pair of transversely spaced connecting members, the improvement comprising:
   said harvester having a transversely extending frame including hitch connectors pivotally supported by the connecting members, the frame including a side portion extending transversely from the connecting members to a location rearwardly and outwardly of the ground engaging wheel of the tractor;
   a vertically movable linkage extending forwardly from, and having an aft end pivotally connected to, the side portion of the frame at a location outwardly of the ground engaging wheel of the tractor;
   a harvester row unit supported from a forward end of the linkage and having a forward portion extending fore-and-aft beside and outwardly of said wheel of the tractor;
   an arm connected to the linkage and extending downwardly and forwardly therefrom;
   a gauge wheel supported from a lower forward end of the arm in contact with the ground, the gauge wheel moving the row unit up and down over irregularities in the surface of the field; and
   a row unit lift actuator connected between the row unit and the arm for selectively moving the gauge wheel relative to the row unit to raise and lower the row unit relative to the frame.

2. The combination as set forth in claim 1 wherein the arm includes an upper rearward end connected to the forward end of the linkage.

3. The combination as set forth in claim 2 wherein the lift actuator comprises a cylinder connected between the arm and the row unit.

4. The combination as set forth in claim 1 wherein the arm is pivotally connected to the row unit adjacent a pivot location of the linkage with the row unit.

5. The combination as set forth in claim 4 wherein said linkage includes two transversely spaced links having forward ends pivotally mounted to said row unit and a rearward end of said arm having a pivotal connection with said row unit which is transversely aligned with the pivotal connection of said spaced links with said row unit.

6. The combination as set forth in claim 1 wherein the linkage includes two transversely spaced links pivotally connected to the side portion of the frame at transversely spaced locations.

7. The combination as set forth in claim 6 further comprising a crop conveyor extending upwardly from the row unit between the two transversely spaced links.

8. The combination as set forth in claim 6 further comprising a fore-and-aft extending driveshaft located between the transversely spaced links and drivingly connected to the row unit.

9. The combination as set forth in claim 1 including a row unit speed synchronizing drive member connected between the tractor and the row unit.

10. The combination as set forth in claim 1 wherein said gauge wheel includes a gauge wheel axle having a fore-and-aft location closely approximating the fore-and-aft location of the tractor ground engaging wheel axle.

11. The combination as set forth in claim 10 further comprising a frame supporting caster wheel depending from the frame behind the hitch connectors.

12. The combination as set forth in claim 1 wherein the row unit comprises a cotton harvesting row unit, and further comprising an upright cotton conveying duct supported between the row unit and the side portion of the frame, and a fan supported from the frame.

13. The combination as set forth in claim 12 further comprising a drive shaft extending rearwardly of the connecting members, a drive pulley connected to the aft end of the drive shaft rearwardly of the frame, a first driven pulley connected to the fan, and a second driven pulley connected to the row unit, wherein the drive and driven pulleys are supported generally behind an aft-most portion of the frame and the second driven pulley comprises an adjustable row unit drive speed sheave.

14. The combination as set forth in claim 13 wherein the frame includes a rear frame member extending transversely behind the connecting members, wherein the side portion of the frame includes a rear support offset rearwardly from and to one side of the rear frame member, and wherein the linkage is connected to the rear support and the cotton conveying duct extends upwardly at a location forwardly of the rear support, and further comprising a cotton receptacle offset to one side of the row unit above the rear frame member and a caster wheel connected to the frame below the basket.

15. In a combination of a cotton harvester and a tractor movable in a forward direction over a field plants to be harvested, the tractor having a ground engaging rear drive wheel with an axle and having a hitch including a pair of transversely spaced connecting members, the improvement comprising:

said harvester having a transversely extending frame including hitch connectors pivotally supported by the connecting members, the frame further including a side portion extending transversely from the connecting members to a location rearwardly and outwardly of the ground engaging rear drive wheel of the tractor;

a row unit support joined to, and extending forwardly from, the side portion of the frame;

a cotton harvester row unit supported from the row unit support and having a row receiving area offset outwardly of, and extending beside the rear drive wheel; and a row unit lift wheel assembly connected to the row unit, the lift wheel assembly including a gauge wheel having an axle located in a fore-and-aft position that closely approximates a fore-and-aft position of the axle of the rear drive wheel and a lift actuator coupled between the row unit support and the lift wheel assembly for moving the gauge wheel relative to said row unit to raise and lower the row unit relative to the frame.

16. The combination as set forth in claim 15 wherein said harvester further includes a rear caster wheel supporting the frame behind the hitch connectors; and wherein the gauge wheel comprises a non-steerable wheel.

17. The combination as set forth in claim 15 wherein said tractor further includes a power take-off drive connected to the cotton harvester row unit, the drive including a variable drive supported on the frame and synchronizing row unit drive speed with forward speed of the row unit.

18. The harvester as set forth in claim 15 wherein the harvester row unit support is pivotally connected to the side portion of the frame, and the row unit lift wheel assembly includes a downwardly and forwardly directed arm pivotally connected at an upper rearward end to the row unit support and connected at a lower forward end to the gauge wheel, and wherein the actuator comprises a hydraulic cylinder connected between the row unit support and the arm.

* * * * *